United States Patent
Mårdberg Jozsa et al.

(10) Patent No.: US 8,584,460 B2
(45) Date of Patent: Nov. 19, 2013

(54) METHOD AND ARRANGEMENT FOR REDUCING AN $NO_x$ CONTENT IN THE EXHAUST GAS OF AN INTERNAL COMBUSTION ENGINE IN A VEHICLE

(75) Inventors: Peter Mårdberg Jozsa, Göteborg (SE); Arne Andersson, Mölnlycke (SE)

(73) Assignee: Volvo Lastvagnar AB, Göteborg (SE)

( * ) Notice: Subject to any disclaimer, the term of this patent is extended or adjusted under 35 U.S.C. 154(b) by 349 days.

(21) Appl. No.: 13/130,058

(22) PCT Filed: Nov. 19, 2008

(86) PCT No.: PCT/SE2008/000650
§ 371 (c)(1),
(2), (4) Date: Jun. 30, 2011

(87) PCT Pub. No.: WO2010/059079
PCT Pub. Date: May 27, 2010

(65) Prior Publication Data
US 2011/0296833 A1  Dec. 8, 2011

(51) Int. Cl.
*F02G 3/00* (2006.01)
*F01N 3/00* (2006.01)
*F01N 5/02* (2006.01)
*F01N 3/08* (2006.01)
*F02G 5/02* (2006.01)
*F01N 3/20* (2006.01)
*F02B 41/10* (2006.01)
*F02B 37/00* (2006.01)
*F02B 1/04* (2006.01)
*F01N 5/04* (2006.01)

(52) U.S. Cl.
CPC . *F02G 5/02* (2013.01); *F02B 41/10* (2013.01); *F02B 37/005* (2013.01); *F02B 1/04* (2013.01); *F01N 5/04* (2013.01); *F01N 3/0842* (2013.01); *F01N 3/2066* (2013.01); *F01N 2610/05* (2013.01)
USPC .................. 60/624; 60/614; 60/286; 60/295

(58) Field of Classification Search
USPC ................ 60/624, 614, 605.2, 285, 286, 295
See application file for complete search history.

(56) References Cited

U.S. PATENT DOCUMENTS 5,056,315 A * 10/1991 Jenkins .......................... 60/624
6,516,609 B2 * 2/2003 Igarashi et al. ................ 60/295
(Continued)

FOREIGN PATENT DOCUMENTS

| EP | 1252427 B1 | 11/2005 | ............. F01N 3/023 |
| WO | 9931373 A1 | 6/1999 | ............. F02B 41/10 |

OTHER PUBLICATIONS

International Search Report for corresponding International Application PCT/SE2008/000650, Date of the Actual Completion of the International Search: Jun. 22, 2009.

(Continued)

*Primary Examiner* — Thai Ba Trieu
(74) *Attorney, Agent, or Firm* — WRB-IP LLP

(57) ABSTRACT

A method and an arrangement are provided for reducing a NOx-content in the exhaust gas of an internal combustion engine in a vehicle. An exhaust gas recirculation supplies exhaust gas from the exhaust outlet to the intake of the internal combustion engine, and at least two energy absorbers are provided in series in the exhaust flow downstream of the exhaust outlet and absorb energy of the exhaust gas. The exhaust gas is overheated to a first temperature by driving the combustion engine in a range of rotational speed producing hot exhaust gas at the exhaust outlet. The first temperature is sufficient to drive the at least two energy absorbers. A temperature of the exhaust gas is established downstream of the at least two energy absorbers sufficient to remove NOx from the exhaust gas in the exhaust after treatment system with an efficiency of more than 80%.

14 Claims, 3 Drawing Sheets

(56) References Cited

U.S. PATENT DOCUMENTS

| | | | |
|---|---|---|---|
| 6,539,716 B2 | 4/2003 | Finger et al. | 60/624 |
| 6,672,050 B2 * | 1/2004 | Murata et al. | 60/295 |
| 6,935,989 B2 | 8/2005 | Shibagaki | |
| 7,370,470 B2 | 5/2008 | Graupner et al. | |
| 2005/0288150 A1 | 12/2005 | Hitch et al. | 60/286 |
| 2008/0163610 A1 | 7/2008 | Baird et al. | |
| 2009/0025369 A1 * | 1/2009 | Yoshida et al. | 60/295 |
| 2009/0188238 A1 * | 7/2009 | Yoshida et al. | 60/285 |

OTHER PUBLICATIONS

International Preliminary Report on Patentability for corresponding International Application PCT/SE2008/000650, Date of Completion of this Report: Oct. 21, 2010.

* cited by examiner

METHOD AND ARRANGEMENT FOR REDUCING AN $NO_x$ CONTENT IN THE EXHAUST GAS OF AN INTERNAL COMBUSTION ENGINE IN A VEHICLE

BACKGROUND AND SUMMARY

The invention relates to a method for reducing an NOx-content in the exhaust gas of an internal combustion engine in a vehicle and an arrangement for reducing an NOx content in the exhaust gas of an internal combustion engine.

The recent years have shown a trend towards stricter legislation concerning emission levels from vehicles. For gasoline powered vehicles, the three-way catalyst has made it possible to run an engine practically without unwanted emissions.

For diesel powered vehicles or compression ignition (CI) engines, the emission problems are, however, far from solved. CI engines have inherent high emission levels for nitric oxides NOx, such as NO and NO2, and particulate matter, such as soot, whereas the emission levels of carbon monoxide (CO) and hydrocarbons (HC) are low. Moreover, it is fairly easy to reduce the already low emission of HC and CO from a CI engine.

One other inherent feature of CI engines is the low fuel consumption. There is, however, a well-known trade-off between fuel consumption and emissions: an engine tuned for maximum fuel economy will emit large amounts of NOx and small amounts of particulates, whereas an engine tuned for low emissions of NOx will get a high fuel consumption and high emissions of particulates.

Another well known phenomenon is the connection between engine speed and particulate emissions. Lowering of the engine speed usually leads to a reduction of the particulate emissions, simply due to the fact that there will be more time to combust the particulates in the combustion chamber.

Today, it is more or less an industry standard to provide the engine exhaust system with some kind of exhaust after treatment system, e.g. a particulate trap, a three-way catalyst (for gasoline engines), an SCR (SCR=Selective Catalytic Reduction) of an NOx trap.

A common method to improve the performance and fuel consumption of a CI engine is to provide the engine with a turbocharger. The function of the turbocharger is to recover some of the energy present in the exhaust gases in a turbine connected to a compressor used to compress air to be let into the engine cylinders. This leads to more air being inducted into the cylinders during the intake stroke, which in turn leads to the engine being able to provide more power per swept engine volume.

Another method to recover exhaust energy is to use a so-called turbo-compound. A turbo-compound resembles a turbocharger, but the turbine of the turbo-compound is connected to provide the crankshaft of the engine instead of providing energy to a compressor supercharging the engine, which is the case for a turbocharger. The transfer of energy from the turbine to the crankshaft could be achieved in any suitable way, but the two most common ways are to either provide a mechanical connection between the turbine and the crankshaft or to provide the turbine with an electrical generator connected to an electrically powered motor connected to the crankshaft.

Moreover, particulate emissions depend heavily on injection pressure, i.e. the pressure with which the diesel fuel is injected into the combustion chambers. The higher the injection pressure, the lower the particulate emissions.

EP 1 036 270 describes an exhaust after treatment system (EGR) and a turbocharger in series with a turbo compound which can reduce the amount of NOx emitted by an internal combustion engine. The turbo compound is advantageous to increase the exhaust gas backpressure which can be used for improving the exhaust gas recirculation.

U.S. Pat. No. 6,539,716 B2 discloses an internal combustion engine with a turbocharger and a turbo compound in series, both driven by exhaust gas. The two turbines are provided to have a specific size relationship determined by the power absorption capability of each turbine. The series connection of the turbines increases the pressure at the engine outlet compared to the inlet thus providing a propulsion pressure for EGR.

It is desirable invention to provide an improved method for reducing an NOx content in the exhaust gas of an internal combustion engine in a vehicle which allows to achieving low exhaust emissions, particularly low emissions of HC, CO, NOx and particulates, and a good fuel economy of an engine. It is also desirable to provide an improved arrangement for reducing an NOx content in the exhaust gas of an internal combustion engine in a vehicle.

According to a first aspect of the invention a method is proposed for reducing an NOx-content in the exhaust gas of an internal combustion engine in a vehicle, the combustion engine comprising at least one cylinder, an intake for the supply of air, an exhaust outlet for discharging exhaust gases into an exhaust after treatment system for reducing emissions of the internal combustion engine, wherein an exhaust gas recirculation supplies exhaust gas from the exhaust outlet to the intake of the internal combustion engine, and at least two energy absorbers in series in the exhaust flow downstream of the exhaust outlet absorb energy of the exhaust gas. Overheating of the exhaust gas to a first temperature is achieved by driving the combustion engine in a range of rotational speed producing hot exhaust gas at the exhaust outlet, wherein the first temperature is sufficient to drive the at least two energy absorbers, wherein a temperature of the exhaust gas is established downstream of the at least two energy absorbers sufficient to remove NOx from the exhaust gas in the exhaust after treatment system with an efficiency of more than 80%. It is possible to operate the after treatment system, particularly a catalyst in the after treatment system, at a favourable temperature while the combustion engine is operated in a favourable regime of fuel consumption. Preferably, the engine is run at lowest possible speed, but at a higher load to keep power constant. Favourably, engine efficiency is high in this region, especially for turbo compound engines. Higher load increases the exhaust temperature. Overheating the exhaust can be achieved preferably by a lower rotational speed of the engine with a higher load to provide a given constant power and/or a lower air surplus. Particularly, low rotational engine speed is used for achieving a high ('overheated") exhaust gas temperature compared with the same engine power at higher engine speed.

The method is used at least during high load phases of the engine. The method can also be applied during medium load phases of the combustion engine. The desired rotational speed is preferably at a low value which produces high temperatures in the exhaust gas. A low rotational speed can preferably be established by using an automated mechanical transmission with power shift which is a dual clutch transmission wherein virtually no output power loss occurs when shifting between gears of the transmission.

The rotational speed of the internal combustion engine is varied depending on the NOx content downstream of the after treatment system and/or depending on the predicted NOx conversion possibility of the after treatment system.

The speed can be adjusted to be within the high efficient range of the after treatment system.

Particularly, the engine speed can be reduced especially at lower load in order to increase the exhaust temperature which is favourable for an SCR catalyst or system and for a particulate filter. The higher exhaust temperature from lower engine speed increases the exhaust energy that drives the turbo compound. Further, engine friction work can be reduced by lowering the engine speed. At high load the exhaust temperature is reduced to be within after treatment high efficiency temperature range by having two turbine expansions. This favourably results in an unusually narrow temperature band for the exhaust after treatment system.

Particularly at cold start when the SCR is inactive, the engine can favourably be run at a higher temperature in order to drive exhaust gas recirculation better to keep the NOx emission at the engine outlet down. Another solution to this problem can be to use an old exhaust pressure governor to create an extra exhaust gas recirculation driving pressure at cold start.

Favourably, the NOx content is measured and/or calculated for reliable controlling the combustion engine appropriately. The rotational speed can be kept low enough particularly if an automated mechanical transmission with power shift can be used. By keeping the speed low the engine will produce exhaust with an even and high enough temperature to be within a certain temperature window and space velocity will be lower due to low speed, i.e. lower air intake.

By adjusting a speed of a transmission unit depending to the rotational speed of the internal combustion engine and the required propulsion and/or the required temperature upstream of the at least two energy absorbers, the rotational speed of the combustion engine can be chosen so low that the exhaust temperature can be kept at sufficiently high values. Thus, the NOx content can be lowered. The speed can be changed by adjusting a transmission gear of a transmission unit. Favourably, keeping the rotational speed of the combustion engine in a range between 800 rpm and 1500 rpm, preferably between 850 rpm and 1300 rpm, produces sufficiently high exhaust gas temperatures.

Preferably, a variation of the rotational speed of the combustion engine can be kept below 200 rpm.

The exhaust gas temperature can be reduced to a desired temperature range which is favourable for NOx conversion in a catalyst by preferably using an exhaust gas turbine of a turbocharger and a turbine of turbo compound in series for cooling the exhaust gas. Although the temperature of the exhaust increases when the combustion engine is running at very low speed, the at least two energy absorbers reduce the exhaust temperature to a favourable temperature interval which is particularly favourable for removing NOx from the exhaust gas. The catalyst can be e.g. a SCR catalyst or a NOx absorbing catalyst. Preferably the temperature of the exhaust gas can be established to a value between at least 330° C. and not more than 450° C. The temperature of the exhaust gas can particularly be established to a value between at least 350° C. and not more than 400° C. In this temperature range, particularly an SCR catalyst can operate under optimum operation conditions with a very high efficiency in NOx conversion.

The temperature range can particularly be established to be in an optimum range for selective catalytic reduction (SCR) of NOx in the exhaust gas by a well adapted combination of low rotational speed of the combustion engine, an appropriately selected transmission ratio and absorbing exhaust energy in the at least two energy absorbers. Preferably, the transmission unit coupled to the combustion engine has discrete gears between which can be switched without losses or with only insignificant losses in propulsion when shifting between the gears.

Favourably, a lambda value of the fuel/air ratio supplied to the combustion engine of not more than 1.4 can be established. Preferably, a lambda value between 1.2 and 1.4 can be established. The low lambda values can be achieved particularly by using a turbo compound as an energy absorbing unit.

A system for a combustion engine having a turbocharger unit arranged for extraction of a certain amount of energy from the exhaust gases and feeding this energy back to the engine, e.g. to the engine crankshaft, is normally called a "turbo compound" system. The energy fed back to the engine can also be fed back to a generator coupled to the engine or in a spilt arrangement where the energy can be fed back to the engine crankshaft as well as to a generator. By using the two turbines (turbo charger and turbo compound) that are arranged in series, a pressure is achieved during operation of the combustion engine on the exhaust side of the combustion engine, which is higher than the pressure on its intake side. Thus, a sufficient propulsion pressure is obtained for recirculation of EGR gases to the intake manifold, without deterioration of the efficiency of the combustion engine. Hereby, part of the energy contained in the exhaust gases is utilised as additional power to the crankshaft instead of being conducted out into the atmosphere and thus being lost.

Because of the turbo compound, the amount of excess air provided to the combustion engine is reduced and thus lambda is reduced from typically high values of about e.g. 1.7 down to 1.4 or less. The turbo compound favourably increases the exhaust back pressure of the combustion engine which is advantageous for EGR (exhaust gas recirculation) and allows using a high efficiency turbocharger at the air intake of the combustion engine. Favourably, with a very efficient turbocharger the pressure differential between exhaust and intake manifolds does not drive exhaust gas recirculation. This can usually solved by choosing a turbocharger with lower efficiency. Low efficiency means more pressure drop creating higher pressure in exhaust manifold, and means further building less pressure in inlet manifold. With the extra pressure drop from the turbo compound, however, the pressure in the exhaust manifold will increase and the exhaust gas recirculation will also flow with a high efficiency turbocharger.

According to another aspect of the invention, an arrangement for reducing the NOx emissions of a combustion engine for performing the above described method, comprising an internal combustion engine with at least one cylinder, an intake for the supply of air, an exhaust outlet for discharging exhaust gases into an exhaust after treatment system for reducing emissions of the internal combustion engine, an exhaust gas recirculation supplying exhaust gas from the exhaust outlet to the intake of the internal combustion engine, and at least two energy absorbers in series in the exhaust flow downstream of the exhaust outlet. A transmission unit is provided which coupled between the internal combustion engine and a drive shaft of the vehicle which allows for a predetermined rotational speed of the internal combustion engine for overheating the exhaust gas; and exhaust gas energy is absorbable in the at least two energy absorbers to establish a temperature of the exhaust gas in a desired temperature range for NOx conversion in the after treatment system depending on the rotational speed of the combustion engine. Particularly, low rotational engine speed is used for achieving a high ("overheated") exhaust gas temperature compared with the same engine power at higher engine speed.

The transmission of the transmission unit is variable to allow for a predetermined narrow speed range of a rotational speed of the internal combustion engine. The combustion engine is preferably driveable with a low rotational speed between 850 rpm and 1500 rpm.

The arrangement according to the invention is intended for a combustion engine, preferably a diesel engine, particularly a diesel engine of a heavy duty vehicle, having at least one cylinder, an intake for the provision of air, an exhaust outlet for discharging exhaust gases, a further line for recirculation of exhaust gases from said outlet to said intake for reduction of harmful emissions from the engine (in the form of CO and NOX and HC compounds), a controllable valve arranged in said further line and a turbocharger unit comprising a first energy absorber for absorbing energy from the exhaust gases and a compressor for compressing air to said intake. The arrangement comprises a second energy absorber absorbing energy from the exhaust gases, arranged downstream of said first energy absorber, for building a pressure in said outlet which surmounts the pressure in said intake.

For exhaust gas recirculation, a separate line between the ordinary exhaust outlet of the engine and a point close to the fresh air intake of the engine is provided. In this line, a controllable valve is arranged, this valve further being connected to a control unit. In dependence of the existing engine operating conditions, particularly regarding its rotational speed and its load, the control unit will determine the degree of opening of the valve, i.e. the amount of EGR gases to be recirculated to the engine air intake. A certain amount of EGR gases will then be fed from the engine exhaust side to its intake side, through the exhaust side pressure normally being higher than the intake side pressure, thus creating a natural "propulsion pressure" for the EGR gases.

In those cases where a diesel engine having an EGR system is utilised together with a turbocharger unit, a problem will be created by there being, for most of the operating points, a higher pressure after the turbocharger compressor (i.e. at the point of the engine intake manifold where the incoming fresh air is fed to the engine) than at the engine exhaust outlet. This in turn means that a recirculation of EGR gases will not be possible, as there will not be any natural propulsion pressure from the engine exhaust to its intake side. In this manner, no EGR gas flow can be injected into the engine.

According to a preferred embodiment of the invention, said engine can be equipped with an EGR system and a system for further extraction of energy from the exhaust gases and feedback of that energy to the engine crankshaft and/or a generator. In this way it is ensured that the required propulsion pressure is built on the engine exhaust side without deterioration of the engine efficiency, as an impaired gas exchange will be compensated for by the extraction of further energy from the exhaust gases and feeding it back to the engine.

The transmission unit can preferably comprise an automated mechanical transmission with power shift (AMT-PS). A double clutch transmission, being considered as a subclass of an automated transmission with power shift, can also be employed.

Preferably, one of the at least two energy absorbers can be coupled to a compressor of a turbocharger. Favourably, one of the at least two energy absorbers is coupled to one of a crankshaft or an electric machine. Advantageously, one energy absorber can encompass a turbine of a turbocharger and one energy absorber can encompass a turbine of a turbo compound.

Advantageously, the after treatment system can comprise a device for reducing a content of particulates, e.g. soot, in the exhaust gas. The after treatment system can comprise a device for removing NOx in the exhaust gas. The two devices are favourable arranged in series in the exhaust flow. The device for reducing a content of particulates can be arranged upstream or downstream of the device for removing NOx. In the case of an upstream arrangement, NOx in the exhaust can be used to oxidize the particulates, e.g. soot and unburned hydrocarbon in the device for reducing a content of particulates. Further, a device for oxidizing one or more components in the exhaust gas, particularly an oxidation catalyst, can also be provided.

Preferably, the arrangement can comprise an automated mechanical transmission with power shift (AMT-PS) with an extreme low-speed-gear-changing strategy where the vehicle is geared for cruise way a below maximum power engine speed. Besides the other advantages mentioned, the particulate filter can favourably be continuously catalytically regenerated due to the sufficiently high temperature as well as the operation of a urea based SCR catalyst or system can be improved as urea requires a minimum temperature to work properly.

BRIEF DESCRIPTION OF THE DRAWINGS

The present invention may best be understood from the following detailed description of the embodiments, but not restricted to the embodiments, wherein is shown schematically.

Figure 1:
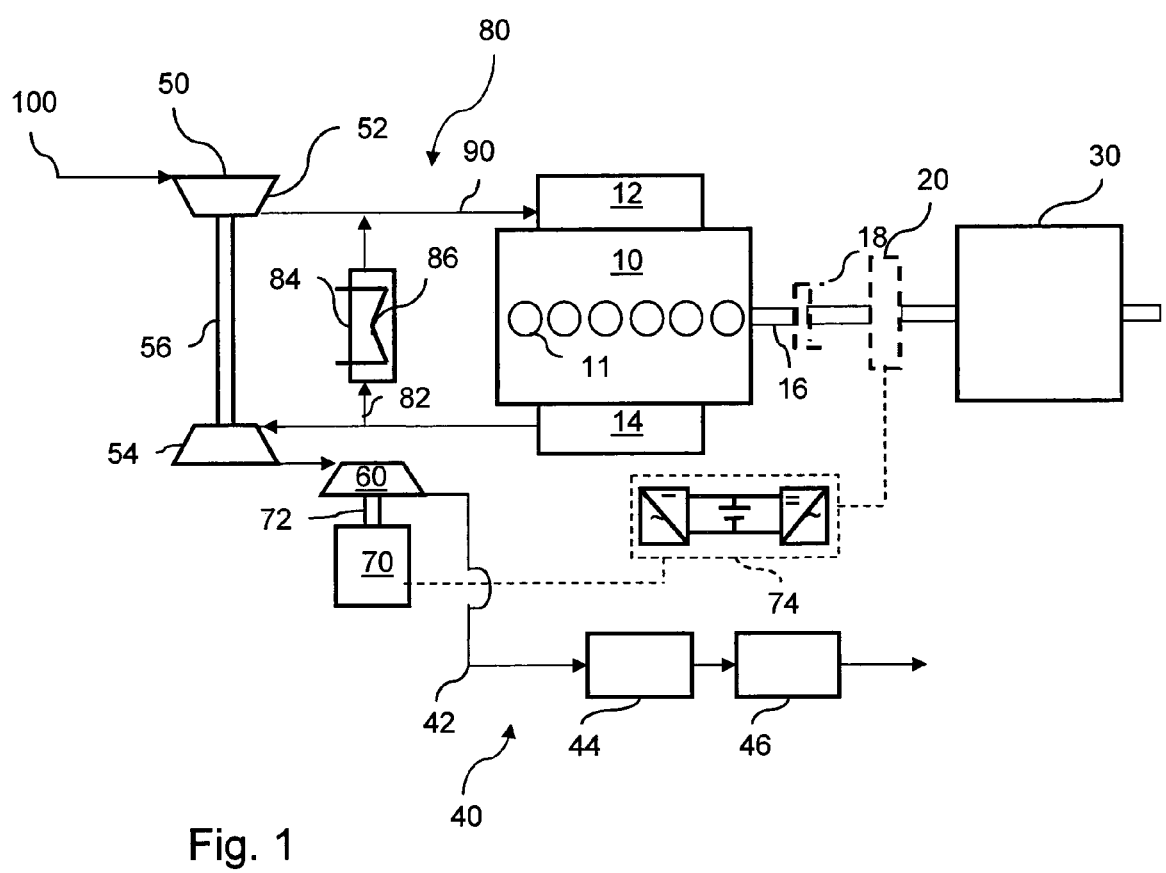
FIG. 1 a first embodiment of an arrangement for a combustion engine comprising an exhaust after treatment system according to the invention.

In the drawings, equal or similar elements are referred to by equal reference numerals. The drawings are merely schematic representations, not intended to portray specific parameters of the invention. Moreover, the drawings are intended to depict only typical embodiments of the invention and therefore should not be considered as limiting the scope of the invention.

DETAILED DESCRIPTION

FIG. 1 schematically illustrates an arrangement according to the present invention, which can be utilised particularly for a combustion engine of the diesel type.

According to a preferred embodiment, the diesel engine 10 is intended for use in a load-carrying vehicle, and comprises e.g. six cylinders 11 (only one is denoted with a reference numeral). The invention is however not limited to any specific number of cylinders or any specific cylinder configuration.

In a way as such previously known, the engine 10 is equipped with an intake manifold 12, to which air is fed from the atmosphere via an intake conduit 90. The input air is then divided between the various cylinders 11. Furthermore, fuel is supplied to the cylinders 11 by a corresponding number of fuel injection devices (not shown) that are each connected to a central control unit (not shown) via an electrical connection (not shown). The control unit, which is preferably computer based, is in a known manner operative to control each fuel injection device so as to supply, in each instant, an appropriate fuel/air mixture to the engine 1.

During operation of the engine 10, the control unit is operative to control the respective injection device in such a way that the fuel/air mixture supplied to the engine 10 will be adapted, in each instant, to the current operating conditions. The fuel supply is hereby obtained in a generally known manner, i.e. in dependence of a multitude of parameters representative of the operating conditions of the engine 10 and the vehicle in question. For example, the control can be performed depending on the present throttle position and the rotational speed and load of the engine 10.

Each cylinder 11 is provided with an exhaust outlet. Together, the exhaust outlets converge into an exhaust manifold 14, continuing into an exhaust pipe 42. This exhaust pipe 42 runs via a turbocharger unit 50, which as such is substantially conventional. Thus, the turbocharger unit 50 comprises a compressor 52 and an energy absorbing unit 54 for absorbing energy from the exhaust gases in the form of a turbine, which is arranged in the exhaust pipe 42 and is being rotated by the exhaust gases flowing through the exhaust pipe 42 and which drives the compressor 56. As an alternative to the embodiment shown in the figure, which is designed in such a way that the exhaust outlets join into a single exhaust pipe 42 (known as a "single inlet"), the exhaust outlets may be grouped into two groups, making the exhaust duct consist of or comprise two pipes leading to the turbine 54 (known as a "twin inlet").

The turbine 54 is arranged on a shaft 56, on which the compressor 52 is likewise arranged. The energy absorbed from the exhaust flow by the turbine 54 is in this way transferred to the compressor 52, which functions to compress the in-flowing air in the air conduit 100 to the intake conduit 12 of the engine 10. In this manner, an increased fuel amount may be fed to the engine 10, whereby its power output can be increased.

The engine 10 is further equipped with an arrangement for recirculation of a certain amount of exhaust gases to the intake side of the engine 10. According to what was discussed in the introduction, an EGR system 80 ("Exhaust Gas Recirculation") is as such previously known. According to the embodiment, a further line in the form of an EGR line 82 is therefore connected to the exhaust pipe 42, at a point upstream of the turbine 54. The EGR line 82 debouches in the intake conduit 90, at a point upstream of the intake manifold 12 of the engine 10. Along the EGR line 82, a controllable valve (not shown) is arranged, connected to the control unit via a further connection (not shown). In an alternative further embodiment, a long-route EGR system can be provided where the exhaust gas is not recirculated upstream of the turbine 54 and downstream of the compressor 52 but instead upstream of the compressor 52 and downstream of the turbine 54.

The control unit is operative, in dependence of the present operating conditions, to adjust the valve to a closed, open or partially open position. Depending on the position of the valve, a corresponding amount of exhaust gases will thus be recirculated to the intake manifold 12 via the EGR line 82. Through the recirculation of these EGR gases to the intake manifold 12, a temperature reduction during the combustion is achieved in the respective cylinder 11, whereby the NOx generation in the cylinder 11 is reduced.

The NOx generation in the respective cylinder 11 is temperature-dependent and for this reason it is desirable to lower, as far as possible, the temperature of the gases (i.e. including air and recirculated EGR gases) coming in to the engine 10. For this reason, the EGR line 82 is provided with a cooler 84 functioning to cool the EGR gases recirculated to the intake manifold 12. To this end the cooler 84 includes a loop 86 through which a suitable coolant is circulated. Preferably, this coolant is the ordinary coolant for the engine 10, but air may also be used for this cooling. By means of this cooler 84, the EGR gases can be cooled, which further contributes to reducing the generated amount of NOx compounds.

The intake conduit 90 is equipped with another cooler (not shown), also known as an "intercooler", which is used for cooling the compressed air supplied by the compressor 52. This also contributes to a reduction of the amount of NOx compounds generated in the engine 10. The second cooler is preferably arranged for cooling by air.

A second turbine 60 is used to absorb energy from the exhaust gases. The second turbine 60 is part of a turbo compound. The exhaust gases leaving the engine 10 and being passed through the first turbine 54 are thus also fed through the second turbine 60, which is then brought to rotate. For this purpose, the second turbine 60 is rotatably arranged on a further shaft 72. After having transferred part of their energy to the second turbine 60, the exhaust gases are conducted out to the atmosphere, preferably by way of a silencer (not shown) after passing through the after treatment system 40. In one example embodiment, the shaft 72 drives a generator 70 which provides electrical energy to an electric machine 20 via a voltage converter 74. The electric machine 20 can be connected and disconnected from the output shaft 16 of the combustion engine 10 by activating or deactivating a clutch 18.

Furthermore, the second turbine 60 can be connected to the output crankshaft (not shown) of the engine 10, via a power transmission, not shown. The power transmission can be preferably of a mechanical type including a gear transmission connecting the shaft 72 to the crankshaft (not shown). The power transmission is moreover provided with a gear reduction for conversion of the rotational speed of the second turbine 60 to a rotational speed suitable for the crankshaft. In this manner, power is transferred between the second turbine 60 and the crankshaft, i.e. a certain amount of energy in the combustion gases can be regained from the exhaust flow and be used as additional power to the crankshaft.

It is also possible to split the power provided by the exhaust gas to the turbine 60 between the crankshaft and the electric machine 20.

The after treatment system 40 favourably comprises at least one of a unit 44 for reducing particulate matter in the exhaust gas or a unit 46 for converting NOx, particularly a SCR catalyst. The NOx converting unit 46 can be arranged upstream or downstream of the unit 44. The unit 44 can be a particulate filter which holds back soot particles and/or an oxidation catalyst for oxidizing unburned carbon.

Preferably, the rotational speed of the combustion engine 10 is below 1500 rpm, particularly between 850 rpm and 1500 rpm. Particularly, the combustion engine 10 is running at a virtually constant rotational speed. By using the combustion engine 10 with a flexible transmission allows for optimizing the rotational speed of the engine with respect to exhaust temperature and/or NOx conversion efficiency.

The lower the rotational speed of the combustion engine, the higher is the exhaust gas temperature in the exhaust manifold 14. The low rotational speed causes not only a high exhaust gas temperature but also a low soot formation and a reduction of air flow provided to the intake manifold 12. The low lambda combustion causes also lower space velocity through the units 44 and 46 due to less air, which can increase the efficiency of the catalytic system.

The exhaust gas temperature can established be in the range of 200° C.-400° C., preferably in a range of 250°-380° C. downstream of the turbo compound and upstream of the NOx converting unit 46, which can be particularly a SCR catalyst. The SCR catalyst yields an efficiency of $\eta > 80\%$ of the SCR catalyst in a temperature range of 300° C.-400° C. This range is advantageous for fresh SCR catalyst as well as aged SCR catalysts.

Figure 2:
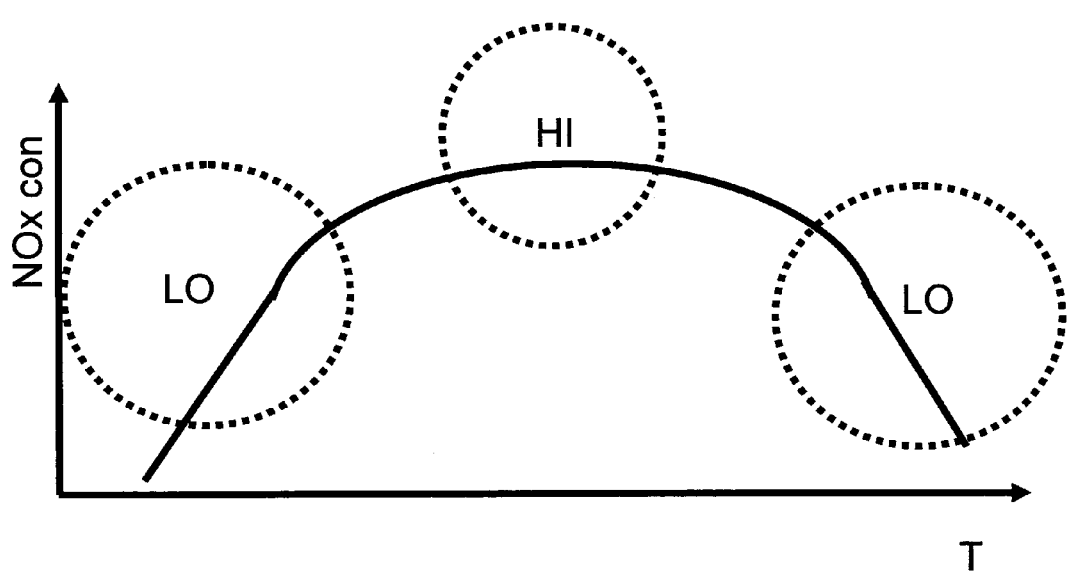
FIG. 2 a NOx-conversion characteristic vs. exhaust temperature.

FIG. 2 depicts a general characteristic of conversion efficiencies of several lean NOx after treatment systems as a function of temperature. At low temperatures, the conversion efficiency is low as well as at high temperatures, which is indicated by a circle LO drawn with a broken line at low and high temperatures. Best efficiencies can be achieved in a medium temperature range which is about between 2000 C to 4000 C, indicated by a circle HI drawn with a broken line at medium temperatures.

Driving the internal combustion engine 10 at a low rotational speed, the exhaust gas temperature downstream of the two energy absorbers 54, 60 can be kept well above 2500 C, wherein the two-stage expansion of the turbocharger 50 and the turbine 60 of the turbo compound keeps the output temperature of the second energy absorber 60 well within the temperature window indicated by the circle HI shown in FIG. 2 below the exhaust gas temperature at the exhaust manifold 14. The energy recovery of the turbo compound increases remarkably with higher exhaust temperatures. A lower rotational speed of the internal combustion engine 10 produces lower soot content in the exhaust leaving the internal combustion engine which means that a lower lambda $\lambda$ is possible for the combustion in the internal combustion engine, resulting in higher exhaust temperatures and a better motor efficiency with the turbo compound, $\lambda$ can range between 1.2 and 1.4 instead of conventionally higher values of up to 1.7.

By providing a higher efficiency $\eta$ at the SCR catalyst the internal combustion engine 10 can optimize for a higher NOx content in the exhaust leaving the internal combustion engine thus providing a better efficiency and a better regeneration of the particulate filter (DPF). Particulate matter in the particulate filter can be oxidized by NOx in the exhaust gas. In this case, the unit 44 is arranged preferably arranged upstream of the unit 46.

A temperature of T>300° C. is favourable for a particulate filter for passive regeneration. For a SCR catalyst, the temperature should preferably be below T<3800 C. A low speed strategy of the internal combustion engine 10 with a very low rotational speed improves the space velocity, particularly lowers the space velocity, of the exhaust gas and possible reduces the slip of NOx through the catalyst unit 46.

Figure 3:
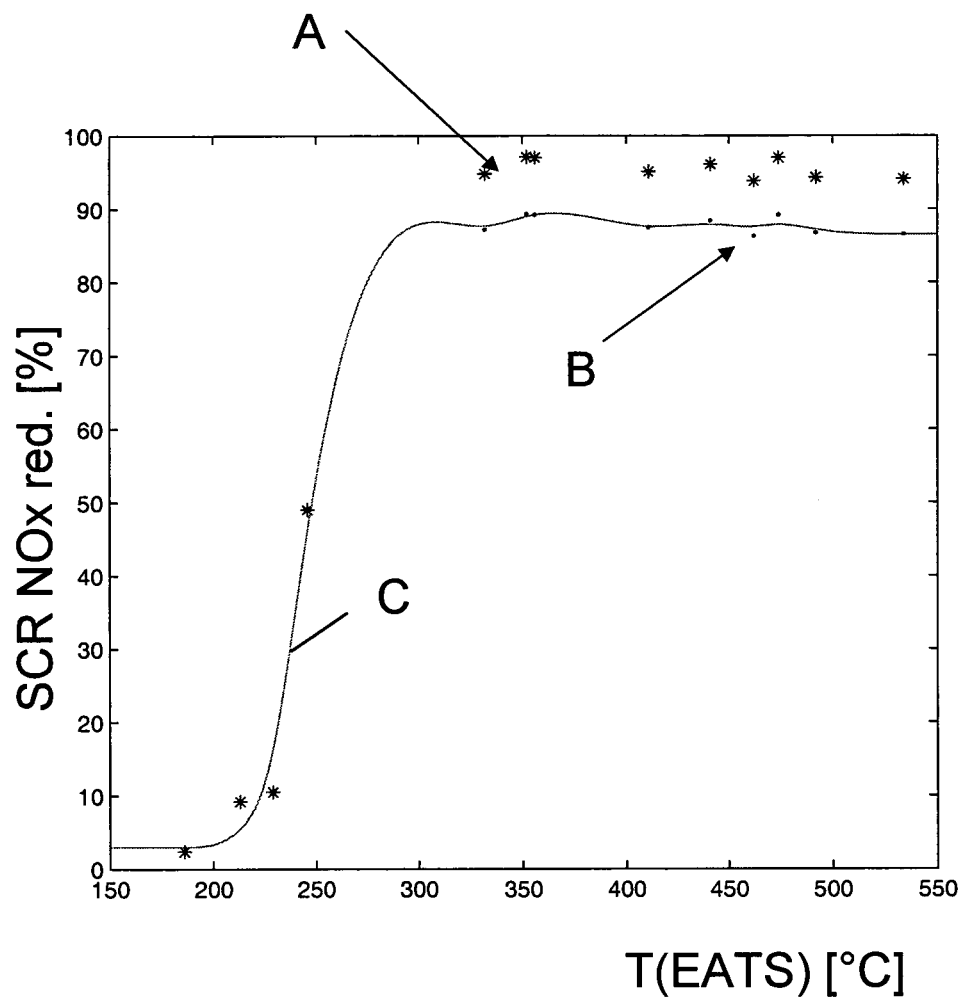
FIG. 3 a comparison between a calculated and measured temperature dependent characteristics of NOx conversion according to the invention.

FIG. 3 illustrates measured values shown as dots A and a modelled curve shown as curve C of a NOx reduction efficiency in an SCR catalyst employed as unit 46 in the after treatment system 40 as a function of the temperature of the exhaust after treatment system (EATS).

The measured values can be normalized yielding normalized values shown as dots B. The modelled curve C fits well the normalized values B.

By using a low rotational speed of the internal combustion engine 10 for increasing the exhaust gas temperature at the exhaust manifold 14 in combination with an automated mechanical transmission with power shift as transmission unit 30 and a turbocharger 50 in combination with a turbo compound for reducing the exhaust gas temperature. Efficiencies NOx reduction as high as 80% can be established in the desired temperature range. For a fresh system the efficiencies are high even at moderately higher temperatures. If the system is aged the efficiency at high temperatures can decrease.

The invention claimed is:

1. A method for reducing an NOx content in the exhaust gas of an internal combustion engine in a vehicle, the combustion engine comprising at least one cylinder, an intake for the supply of air, an exhaust outlet for discharging exhaust gases into an exhaust after treatment system for reducing emissions of the internal combustion engine, wherein an exhaust gas recirculation supplies exhaust gas from the exhaust outlet to the intake of the internal combustion engine, and a turbine of a turbo charger and a turbine of a turbo compound as at least two energy absorbers arranged in series in the exhaust flow downstream of the exhaust outlet for absorbing energy of the exhaust gas, comprising:

driving the combustion engine during at least one of a high load phase and a medium load phase at a specific power with a higher load and a lower rotational speed compared to a rotational speed commonly chosen for the specific power;

overheating the exhaust gas to a first temperature by driving the internal combustion engine at the lower rotational speed which is sufficient to drive the at least two turbines and to establish a temperature of the exhaust gas downstream of the at least two turbines;

cooling the overheated exhaust gas in the two turbines to a desired temperature range favourable for NOx conversion in the after treatment system; and varying the rotational speed of the internal combustion engine depending on at least one of the NOx content downstream of the after treatment system and a predicted NOx conversion possibility of the after treatment system.

2. The method according to claim 1, comprising adjusting a transmission gear of a transmission unit depending on at least one of the rotational speed of the internal combustion engine and the established temperature upstream of the at least two energy absorbers.

3. The method according to claim 1 comprising keeping the rotational speed of the combustion engine in a range between 800 rpm and 1500 rpm.

4. The method according to claim 1 comprising keeping a variation of the rotational speed of the combustion engine below 200 rpm.

5. The method according to claim 1 wherein the temperature of the exhaust gas downstream of the two energy absorbers is established in a temperature range which is within an optimum range for reducing NOx in an NOx reducing catalyst in the exhaust after treatment system.

6. The method according to claim 5, wherein the temperature of the exhaust gas is established to a value between at least 330° C. and not more than 450° C., preferably to a value between at least 350° C. and not more than 400° C.

7. The method according to claim 1 comprising establishing a lambda-ratio of the fuel/air mixture supplied to the combustion engine of not more than 1.4.

8. An arrangement for reducing NOx emissions of a combustion engine, comprising an internal combustion engine with at least one cylinder, an intake for the supply of air, an exhaust outlet for discharging exhaust gases into an exhaust alter treatment system for reducing the NOx emissions of the internal combustion engine, an exhaust gas recirculation supplying exhaust gas from the exhaust outlet to the intake of the internal combustion engine, and a turbine of a turbo charger and a turbine of a turbo compound as at least two energy absorbers arranged in series in the exhaust flow downstream of the exhaust outlet for absorbing energy of the exhaust gas, comprising:

a transmission unit coupled between the internal combustion engine and a drive shaft of the vehicle which allows for a predetermined rotational speed of the internal combustion engine for overheating the exhaust gas, wherein the transmission unit is an automated transmission with power shift which allows for a low rotational speed of the internal combustion engine, and is used for varying the rotational speed of the internal combustion engine depending on at least one of the NOx content downstream of the after treatment system and a predicted NOx conversion possibility of the after treatment system; and at least two turbines for cooling the overheated exhaust gas during at least one of a high load phase and a medium load phase of the internal combustion engine to establish a temperature of the exhaust gas in a desired temperature range for NOx conversion in the after treatment system depending on the rotational speed of the combustion engine.

9. The arrangement according to claim 8, wherein the rotational speed of the combustion engine is established between 850 rpm and 1500 rpm.

10. The arrangement according to claim 8 wherein one of the at least two energy absorbers is coupled to one of a crankshaft or an electric machine.

11. The arrangement according to claim 8 wherein the transmission unit is a continuously variable transmission unit.

12. The arrangement according to claim 8 wherein the after treatment system comprises a device for reducing a content of particulates in the exhaust gas.

13. The arrangement according to claim 8, wherein the after treatment system comprises a device for reducing a content of nitrogen oxides in the exhaust gas.

14. The arrangement according to claim 8, wherein the combustion engine is a diesel engine.

* * * * *